United States Patent [19]

Shimizu et al.

[11] 4,196,645

[45] Apr. 8, 1980

[54] METHOD AND APPARATUS FOR CUTTING A WEB INTO A SPECIFIED LENGTH

[75] Inventors: Shigehisa Shimizu; Shigemitsu Mizutani, both of Minami-ashigara; Noboru Shimmra; Hisahiro Tanigawa, both of Yokohama, all of Japan

[73] Assignee: Fuji Photo Film Co., Ltd., Minami-ashigara, Japan

[21] Appl. No.: 948,612

[22] Filed: Oct. 4, 1978

[30] Foreign Application Priority Data

Oct. 7, 1977 [JP] Japan .................................. 52-120000

[51] Int. Cl.$^2$ ............................................ B26D 1/56
[52] U.S. Cl. ........................................... 83/37; 83/76; 83/311; 83/320
[58] Field of Search ....................... 83/37, 76, 311, 320

[56] References Cited

U.S. PATENT DOCUMENTS

| 3,581,616 | 6/1971 | Kawae et al. ........................... 83/311 |
| 4,034,635 | 7/1977 | Woolston ............................ 83/311 X |
| 4,103,575 | 8/1978 | Utsui et al. ......................... 83/320 X |

*Primary Examiner*—Frank T. Yost
*Attorney, Agent, or Firm*—Sughrue, Rothwell, Mion, Zinn and Macpeak

[57] ABSTRACT

A method and apparatus for cutting a web into a specified length in which an upper cutting edge and a lower cutting edge are provided respectively above and below the web run at a constant speed. The web is cut into the specified length by moving said upper cutting edge vertically while said upper and lower cutting edges are swung in the web movement direction. The swinging and vertical movements of said cutting edges are accomplished by rotation of an eccentric crank shaft driven by a DC motor. A rotation angle of the eccentric crank shaft and a movement length of said web are outputs provided in the form of pulses, respectively, in order to coincide a movement speed of the web with a swinging speed of the cutting edges in cutting said web.

11 Claims, 9 Drawing Figures

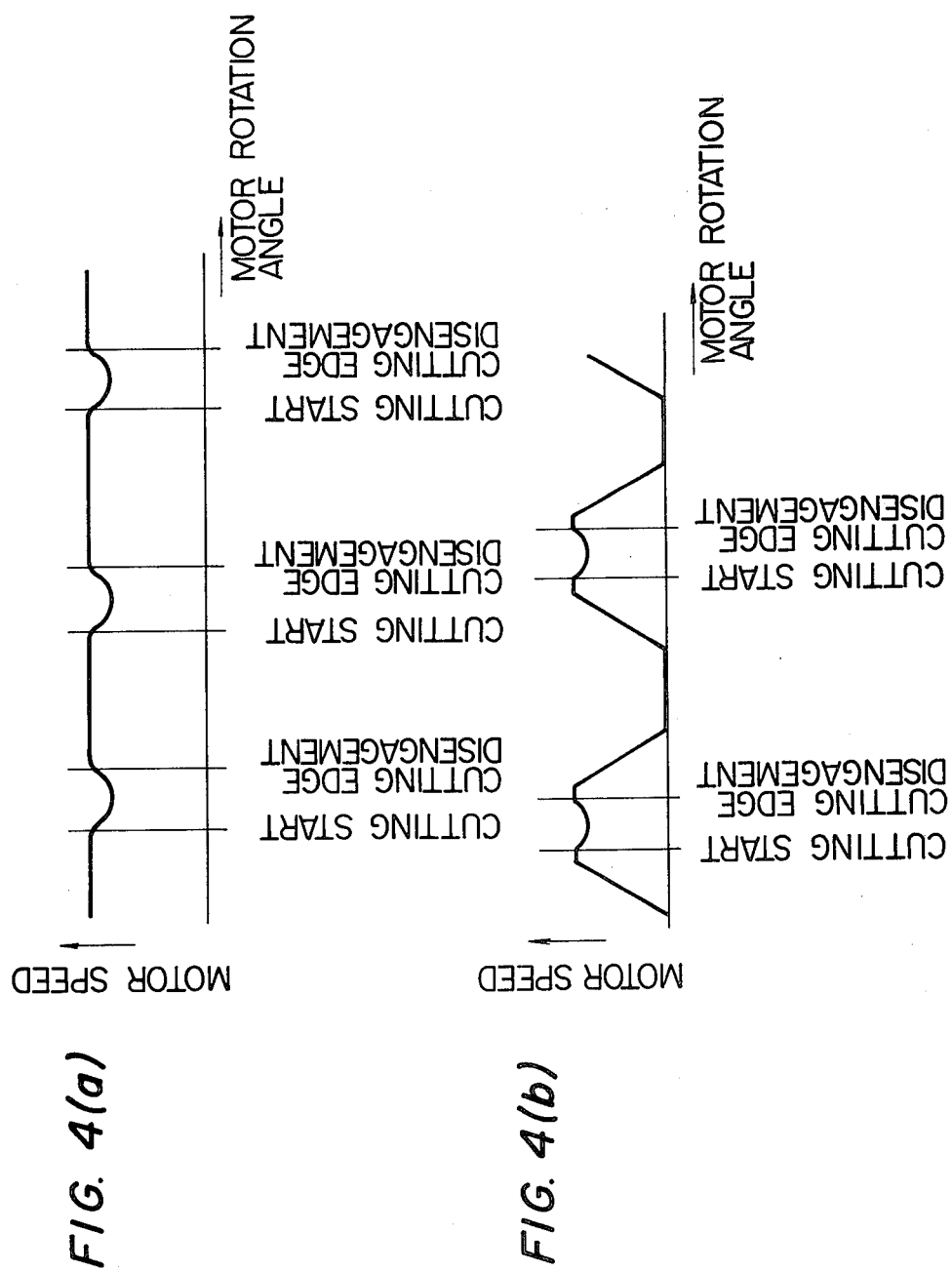

METHOD AND APPARATUS FOR CUTTING A WEB INTO A SPECIFIED LENGTH

BACKGROUND OF THE INVENTION

This invention relates to a method of cutting webs into a specified length and a device for practicing the method, in which a web is run continuously and cut into a specified length at high speed and with high accuracy.

The term "web" as used herein is intended to mean relatively long, flexible, belt-shaped articles such as plastic films made of polyvinyl chloride, polycarbonate, acrylonitrile styrene copolymer, ABS resin, polyester, polyester resin containing glass fibers, cellulose derivative or the like, or sheets such as paper and synthetic paper, or metal foils of aluminum, copper or the like.

Such a web is generally wound on a roll during its manufacturing process. The web thus wound is subsequently unwound to be cut into a desired length depending on its object of use in the following processing. In this case the method and apparatus for cutting the web into a desired length is especially important. Accordingly, the following two techniques have been extensively employed: In the first method, the web feeding roll and the cutting edges are driven by a single electric motor, and the cutting dimension is set by changing the speed change gear ratio of the reduction gear, for cutting the web into a desired length. In the second method, a clutch is employed instead of the reduction gear, and the cutting edges are driven through the clutch operated by a signal representative of a web running length, to thereby cut the web.

In these mechanical control type web cutting methods in which the cutting timing of the cutting edges is set up by a power transmission unit such as a reduction gear or a clutch, fluctuations or variations between the web running speed and the cutting speed of the cutting edges may be repeatedly induced by mechanical errors or inherent properties involved in the driving system. These include clutch slipping and gear backlash. Accordingly, it is impossible to cut a web into a desired length with repeated high accuracy.

In order to overcome these difficulties, a so-called motor control type web cutting method has been provided in which, as disclosed by Japanese Patent Application Laid-Open No's 890/1974 and 142785/1976, an electric motor for driving the cutting edges is provided in addition to an electric motor for the web feeding roll. The first motor is driven by a web running length signal so that the cutting speed and cutting position of the cutting edges are controlled by the operation of that motor. In this method, the above-described mechanical errors can be generally eliminated which therefore contributes to improvement of the cutting accuracy. Also the cutting length can be set electrically. Thus, this method is one which offers improved performance when compared with the conventional prior art methods described before. However, this method is still disadvantageous in that it is difficult to completely synchronize the cutting speed with the web feeding speed. Therefore, the method is not applicable to this case where it is required to cut a web more precisely with an allowable tolerance ±500µ or less.

The reason for this is as follows: The first Japanese Patent Application discloses a cutting edge rotation type web cutting method in which a pair of rotary cutting edges confront each other through a web, while the second Japanese Patent Application discloses a cutting edge swinging type web cutting method in which two cutting edges confronting through a web are moved vertically and are moved in the web running direction. Hence on this point, the two Japanese Patent Applications are different from each other. However, in each of them, the speed of the cutting edges in the web running direction is given by circular motion, and therefore, as will become clear from an explanation described later with reference to FIG. 2, the speed of the cutting edges in that direction is greatly varied. Accordingly it is difficult to cut the web with a high degree of accuracy. If this variation of the speed is decreased, the vertical movement of the cutting edges is accordingly also decreased. With this technique, accordingly, it is impossible to provide sufficient shearing angle and engagement depth for the cutting edge, and it is therefore difficult to cut the web sharply. This leads to an irregular configuration in the web cut surface. This drawback may be eliminated by increasing the rotation radius of the cutting edges carrying out the circular motion. With this modification, the web may be cut into longer pieces; however, it is impossible to cut the web into shorter pieces shorter than 500 mm.

Japanese Patent Application Laid-Open No. 160892/1975 describes a web cutting method in which the speed of cutting edges coincides with a web feeding speed. More specifically, in this method, the rotational speed of a pair of spiral rotary cutting edges confronting each other through a web is allowed to synchronize with the web feeding speed. Web cutting is carried out with a constant maintained speed of the cutting edges in the web feeding direction.

It is, however, difficult to manufacture such spiral cutting edges. Also, it is hard to adjust the edges of the cutting edges, and therefore difficult to cut the web sharply. Furthermore, even if the web can be sharply cut, cutting the web into shorter pieces cannot be easily accomplished. Hence, this technique also has serious disadvantages.

SUMMARY OF THE INVENTION

Accordingly, an object of this invention is to provide a method and apparatus for cutting a web into a specified length, in which all of the drawbacks accompanying the conventional methods described above have been eliminated.

It is another object of this invention to define a system where a web can be cut into a desired length at high speed and with high accuracy and can be cut into shorter pieces.

These objects of the invention can be achieved by providing a method in which an upper cutting edge and a lower cutting edge are provided, respectively, above and below the web run at a constant speed. The web is cut into a specified length by moving the upper cutting edge vertically while the upper and lower cutting edges are swung in the web movement direction. According to this invention, the swinging and vertical movements of the cutting edges are effectuated by rotation of an eccentric crank shaft driven by a DC motor and the rotation angle of the eccentric crank shaft and the movement length of the web are used to generate an output in the form of pulses, respectively. The output pulses are employed to coincide the movement speed of the web with the swinging speed of the cutting the web.

The pulses whose number corresponds to the movement length of the web are thinned out under given conditions at least for a period of time which elapses from the time instant that the cutting edges start cutting the web until the cutting edges complete the cutting. Hence, the number of pulses representative of apparent variation of the movement speed of the web is subtracted in a control register. The number of pulses corresponding to the movement length of the cutting edges is added in the control register. The number of pulses corresponding to one revolution of the eccentric crank shaft is subtracted from the number of pulses corresponding to the specified cutting length whenever the cutting edges pass through a cutting completion angle. The number of pulses obtained from the addition of the number of pulses thinned out in the process of cutting is added or subtracted in the control register and converted into a DC voltage which is added to a DC voltage proportional to the movement speed of the web. This resultant signal is to be used as a speed instruction as to one revolution of the eccentric crank shaft. When the resulting sum is of a polarity allowing the cutting edges to be rotated forwardly, the sum is applied as a speed instruction to a DC motor driving the cutting edges.

The system for carrying out this method uses an eccentric crank shaft driven by a DC motor and is adapted to swing upper and lower cutting edges mounted relative to the moving web. The upper cutting edge is moved vertically. A first pulse generator detects movement of the web and generates a series of output pulses. A second pulse generator is used to detect rotation angle of the eccentric crank shaft and generate a series of output pulses. A detector establishes a reference position of the cutting edges. The circuit employs a thinning circuit to sample and hold pulses generated by the first pulse generator to coincide the swinging speed of the cutting edge with the speed of movement of the web for at least the time interval of the cutting operation. A reference pulse setting unit substracts the number of pulses corresponding to one revolution of the crank from the number of pulses corresponding to a cutting length of the web and adds the number of pulses derived from the thinning circuit. A control register is employed in with the thinning circuit output is subtracted and the output of the second pulse generator is added. A D/A converter converts the output of the control register into an analog voltage and the output is fed to a function generator that increases the amplification factor. A frequency to voltage converter converts the output of the thinning circuit to an analog voltage. This output is fed to an adder where it is combined with the output of the function generator to provide a speed instruction signal to the DC motor.

In this connection, the same effect may be obtained by carrying out all of the addition and subtraction operations in the control register simultaneously in the opposite way.

This invention will be described with reference to a preferred embodiment.

BRIEF DESCRIPTION OF THE DRAWINGS

FIGS. 4(a), 4(b), 4(c) and 4(d) are cutting time charts indicating the operation of the cutting device in FIG. 1.

DESCRIPTION OF THE PREFERRED EMBODIMENT

Figure 1:
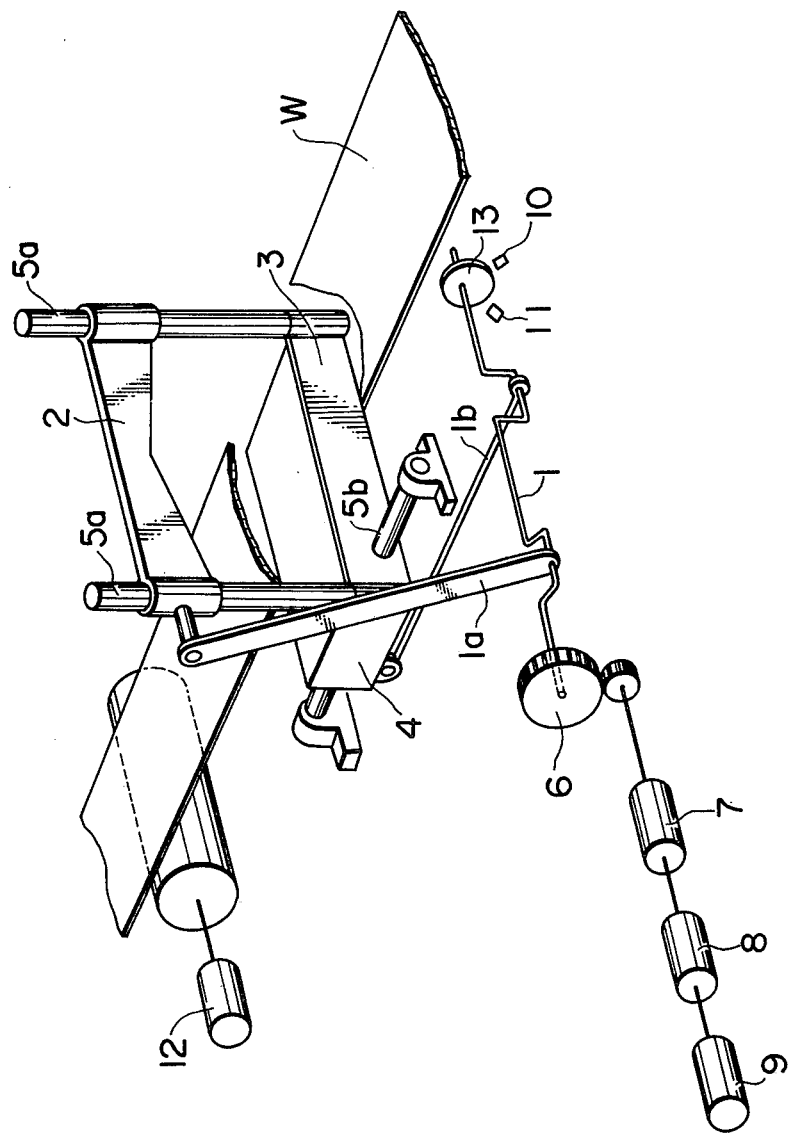
FIG. 1 is a perspective view outlining one example of a web cutting device according to this invention.
Figure 2A:
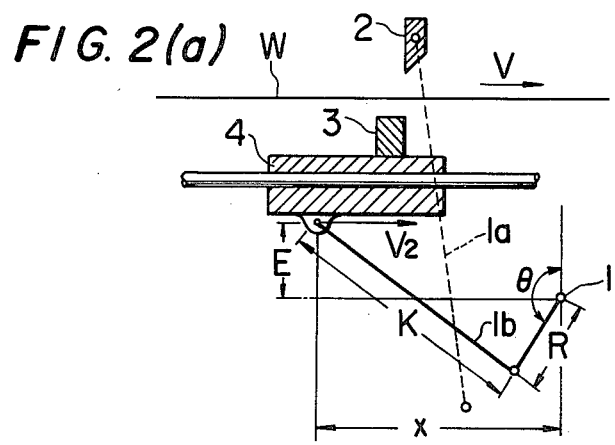
FIG. 2(a) is an explanatory diagram showing a driving mechanism of the device shown in FIG. 1.
Figure 2B:
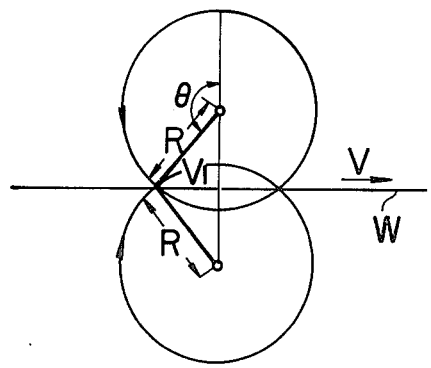
FIG. 2(b) is an explanatory diagram showing a driving mechanism of a conventional web cutting device.
Figure 2C:
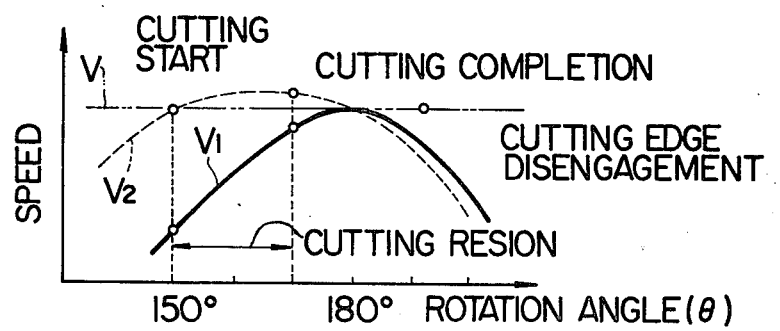
FIG. 2(c) is a graph representing indicating speed characteristics of the driving mechanisms of FIGS. 2(a) and 2(b)
Figure 3:
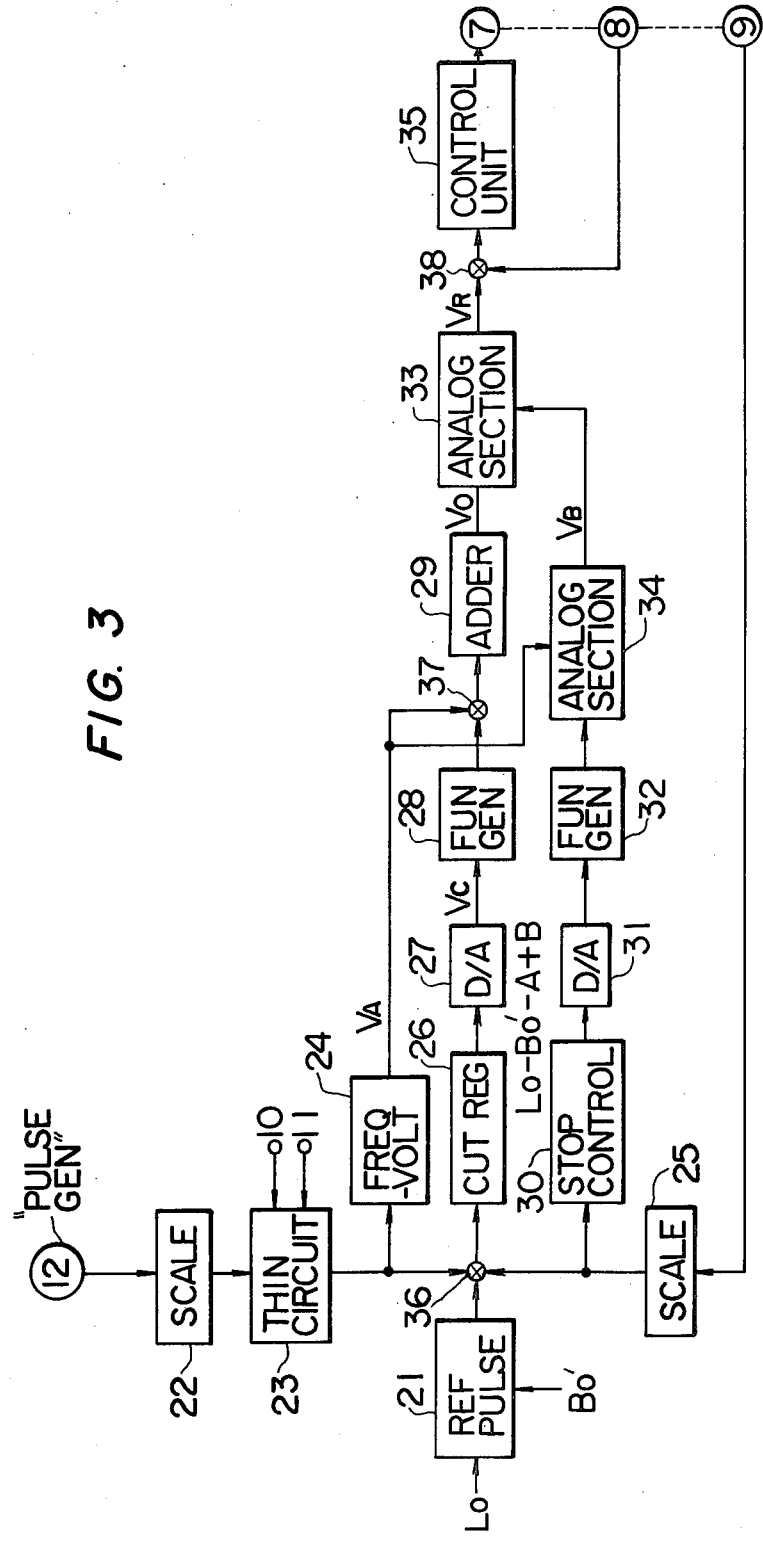
FIG. 3 is a block diagram showing a web specified-length cutting control citcuit in the cutting device shown in FIG. 1.

One example of a web cutting device according to this invention is shown in FIG. 1. It comprises a web W to be cut which is continuously fed at a constant speed by a web feeding roll (not shown). An upper cutting edge 2 is mounted on guides 5a and a lower cutting edge 3 engages the upper cutting edge 3. A swinging frame 4 is coupled to the guide 5a and a guide 5b is employed for guiding the swinging frame 4 horizontally.

A reduction gear 6 is connected to a DC motor 7 that turn drives an analog generator 8. A pulse generator 9 is used to supply a train of pulses in response to analog outputs from generator 8. A cutting start position detector 10 and a cutting edge disengagement position detector 11 are positioned for detecting the position represented on cam element 13 where the upper cutting edge 2 is disengaged from the web W after cutting it. A pulse generator 12 detects the longitudinal movement of the web W. A first connecting rod 1a connects an eccentric crank shaft 1 and the upper cutting edge 2 and a second connecting rod 1b connects the eccentric crank shaft 1 and the swinging frame 4.

The upper cutting edge 2 is coupled through guide means 5a to the swinging frame 4, while the lower cutting edge 3 is connected directly in a fixed manner to the swinging frame 4. Therefore, as the eccentric crank shaft 1 rotates, the upper cutting edge 2 is moved in a horizontal direction while moving along the guide means 5a vertically, while the lower cutting edge 3 is moving the guide 5b. The upper cutting edge 2 has, in general, a shearing angle of 0.5–3 degrees. When the upper cutting edge 2 engages the lower cutting edge at a given certain depth, the web W is cut. The engagement depth and the web cutting position can be theoretically determined from upper cutting edge driving data such as the amount of displacement of the upper cutting edge, that is, the rotational angle of the crank shaft 1, the amount of eccentricity of the crank shaft 1 and the length of the connecting rod 1a. These parameters are determined to suitable values through routine experiments.

Figures 4C, 4D:
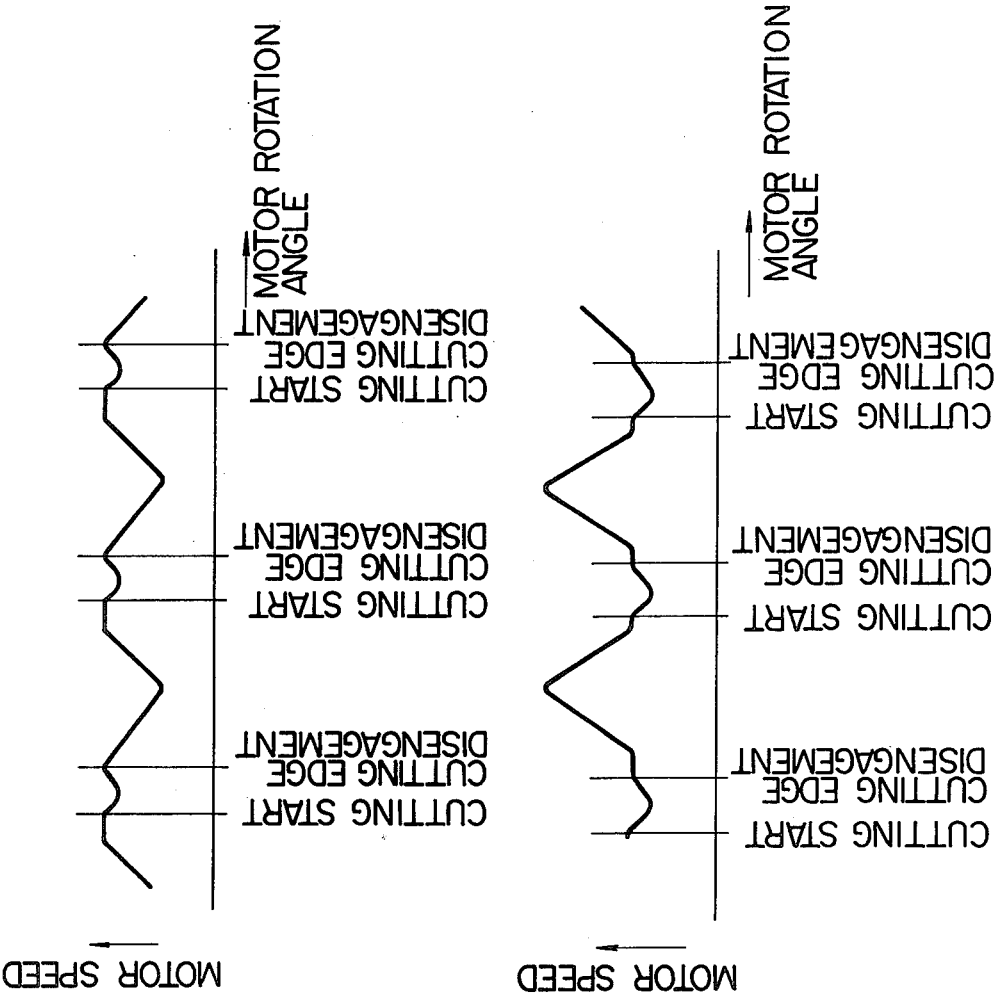

The speed of the upper and lower cutting edges 2 and 3 in the web movement direction coincides with the movement speed of the swinging frame 4, and is determined depending on the rotational angular speed of the eccentric crank shaft 1 together with driving data such as the amount of eccentricity of the eccentric crank shaft 1 and the length of the connecting rod 1b. Connected to the shaft of the DC motor 7 are the analog generator 8 and the pulse generator 9 for detecting the cutting edge rotational angle. The cutting start position detector 10 and the cutting edge disengagement position detector 11 made up of first and second proximity sensors, respectively, are provided on one end portion of the eccentric crank shaft 1 and sense positions using standard encoder techniques with the cam 13. Cam 13 can also be an encode disk symmetrically mounted on shaft 1.

than the value $V_A$, and the DC motor 7 is accelerated upon application of the cutting edge disengagement signal. As the value A becomes greater than the value B, the value R is increased to zero from a negative value, and the DC motor 7 is decelerated so that its speed coincides with the web running speed. This is similar to the case where the cutting length is longer than the predetermined value. The cutting time chart is as indicated in FIG. 4(d).

As is apparent from the above description, in this embodiment, the web movement length pulses are thinned out under given conditions for the period of time which elapses from the time instant that the upper cutting edge 2 starts cutting the web W until it is disengaged therefrom. However, the same effect can be obtained by thinning out the pulses until the upper cutting edge 2 has completed cutting, or for the period of time corresponding to the cutting range shown in FIG. 4(c). In addition, if the cutting edge is to be disengaged from the web at a higher speed after the web is cut, this requirement can be accomplished by suitably decreasing the extent of the thinning-out pulses.

In the above-described preferred embodiment, the upper and lower cutting edges are driven by one DC motor. However, if the web to be cut is relatively thick and rigid, the upper and lower cutting edges may be driven by two DC motors.

As is clear from the above description, this invention has the following significant advantages:

(1) Since the upper and lower cutting edges are swingably moved while the upper cutting edge is moved vertically by the revolution of the eccentric crank shaft, it is possible to allow the cutting edge movement speed to approach the web running speed for a longer time when compared with the conventional cutting device.

(2) As the difference between the cutting edge speed and the web movement speed in the cutting range is controlled to be zero by utilizing a thinning-out circuit, the cutting edge speed can completely coincide with the web movement speed.

(3) The cutting timing of the upper cutting edge can be set as desired independent of the movement of the lower cutting edge, and the shearing angle and engagement depth can be set sufficiently for the upper and lower cutting edges. Therefore, webs can be cut sharply.

Hence, a web can be cut into a desired length irrespective of the web running speed. Thus, a web can be cut into pieces with a high degree high accuracy. It is apparent that variations of this invention can be made without departing from the essential scope thereof.

We claims

1. In a method of cutting a running web into a series of segments of specified length, using upper and lower cutting edges positioned above and below the web, and wherein the cutting is accomplished by vertical movement of the upper cutting edge while the upper and lower cutting edges are moved in the direction of web movement, the improvement comprising the steps of:
rotating an eccentric crank shaft to effectuate vertical movement of said upper cutting edge and movement in the direction of web movement of both said cutting edges;
sensing the rotation angle of said eccentric crank shaft and the movement of said web and generating a series of output pulses in response to said sensed conditions;
thinning the output pulses corresponding to movement of said web for at least a period of time from the initiation to the termination of cutting;
combining pulses from said thinning circuit and pulses corresponding to a movement length of the cutting edges in a control register;
subtrating the number of pulses corresponding to one revolution of the eccentric crank shaft from the number of pulses corresponding to a specified cutting length whenever the cutting edges pass through a cutting completion angle, and supplying the resultant signal to said control register,
converting the pulse value stored in the control register into a DC voltage which is proportional to the movement speed of said web; and
selectively applying said DC voltage as a speed instruction for driving said cutting edges when the polarity of the voltage allows the cutting edges to be driven forward.

2. The method of claim 1 wherein the step of rotating said eccentric shaft comprises the steps of supplying a voltage to a DC motor coupled to said shaft and generating a series of pulses in response to rotation of said motor, wherein the rotational angle of said crank shaft is determined by the number of pulses generated.

3. The method of claim 1 wherein the step of thinning comprises the steps of receiving a number of pulses corresponding to movement of said web in a memory, sensing the time interval between initiation of a cutting sequence until completion and generating a pulse output only during that time interval.

4. The method of claim 3 wherein the step of sensing the time interval comprises the steps of rotating an encoder with said eccentric crank shaft, determining when a point on said encoder passes a first predetermined position and generating an output pulse, determining when said point on the encoder passes a second predetermined position and generating a second output pulse.

5. The method of claim 1 wherein the step of converting the pulse value to a DC voltage comprises the steps of performing a digital-to-analog conversion on said pulse value, and applying the analog signal to a function generator to make the signal a non-linear DC voltage.

6. In a device for cutting a moving web into a specified length having upper and lower cutting edges disposed above and below the web and wherein the web is cut into a specified length by vertically moving said upper cutting edge while moving both said upper and lower edges in the direction of web movement the improvement comprising;
an eccentric crank adapted to move said upper cutting edge vertically and said upper and lower cutting edges in the direction of web movement;
a DC motor for rotating said eccentric crank;
a first pulse generator for detecting the movement of said web and generating a series of output pulses in response thereto;
a second pulse generator for detecting rotation angles of said eccentric crank and generating a series of output pulses in response thereto;
detector means for detecting a reference position of said cutting edges;
means for selectively thinning pulses generated by said first pulse generator during the time interval between initiation and completion of the cutting operation wherein, the output pulses coincide the movement of said upper and lower cutting edges with movement of said web during said time interval;

reference pulse setting means for combining by subtracting a number of pulses corresponding to one revolution of said eccentric crank from a number of pulses corresponding to a cutting length of said web and adding the number of output pulses from said means for selectively thinning;

a control register for adding the output of said second pulse generator subtracting the output of said thinning circuit and selectively adding or subtracting the output of said reference pulse setting means;

a digital-to-analog converter for converting the output of said control register into a first analog voltage;

a function generator receiving the output of said digital to analog converter and providing an output of the same polarity as the first analog voltage generated;

a frequency to voltage converter for converting the output of said means for thinning into a second analog voltage and, means receiving the first and second analog voltages for adding the voltages to generate an output speed signal for said DC motor.

7. The system of claim 6 further comprising stop control means receiving a scaled output from said second pulse generator and modifying the scaled output to reflect movement of said cutting edges in the direction of web movement or in the opposite direction;

a second digital to analog converter receiving the output of said stop control means and converting the pulse count into a third analog voltage;

a non-linear function generator for converting said third analog voltage into a non-linear signal; and first comparator means for selecting the lower of the values of the second or third analog voltages.

8. The system of claim 7 further comprising, second comparator means receiving the output of said first comparator means and selecting the larger of the values of said output of said first comparator or said output speed signal and, a speed control circuit receiving the output of said second comparator to control said DC motor.

9. The system of claim 6 further comprising means to establish a stop control signal, comparator means to select the larger of said stop control signal or said output speed signal and, a speed control circuit receiving the output of said comparator means to control said DC motor.

10. The system of claim 6 wherein said means for selecting thinning comprises memory means receiving the output of said first pulse generator and a driver circuit operative during said time interval to count signals from said pulse generator and to inhibit counting at other time intervals.

11. The system of claim 10 further comprising scaling means interposed between said first pulse generator and said means for selectively thinning whereby said means for selectively thinning counts a predetermined number of pulses during said time interval.

* * * * *